United States Patent [19]

Ando et al.

[11] Patent Number: 5,583,161
[45] Date of Patent: Dec. 10, 1996

[54] RE CROSSLINKABLE COMPOSITION AND METHOD FOR RECYCLING USING THE SAME

[75] Inventors: Makoto Ando, Suita; Satoshi Urano, Tsuzuki-gun, both of Japan

[73] Assignee: Nippon Paint Co., Ltd., Osaka, Japan

[21] Appl. No.: 432,706

[22] Filed: May 2, 1995

[30] Foreign Application Priority Data

May 2, 1994 [JP] Japan .................................. 6-093338

[51] Int. Cl.$^6$ .............................. C08J 11/04; C08J 11/14
[52] U.S. Cl. .............................................. 521/49; 521/49.5
[58] Field of Search ...................................... 521/49, 49.5

[56] References Cited

U.S. PATENT DOCUMENTS

| | | | |
|---|---|---|---|
| 3,919,278 | 11/1975 | Rosenthal et al. | 260/453 P |
| 3,919,280 | 11/1975 | Rosenthal et al. | 260/453 P |
| 3,962,302 | 6/1976 | Rosenthal et al. | 260/453 P |
| 4,081,472 | 3/1978 | Tsumura et al. | 260/453 P |
| 4,159,972 | 7/1979 | Braslaw et al. | 260/2.3 |
| 4,321,402 | 3/1982 | Ryu et al. | 560/24 |
| 4,386,033 | 5/1983 | König et al. | 260/453 P |
| 4,388,246 | 6/1983 | Sundermann et al. | 260/453 P |

FOREIGN PATENT DOCUMENTS

| | | |
|---|---|---|
| 206544 | 5/1986 | European Pat. Off. . |
| 1249426 | 8/1964 | Germany . |

*Primary Examiner*—W. Robinson H. Clark
*Attorney, Agent, or Firm*—Townsend & Banta

[57] ABSTRACT

The present invention provides a method for recycling a polymer crosslinked through acyl carbamate bond. Disclosed is a re-crosslinkable composition obtained by adding an alcohol to the polymer crosslinked through acyl carbamate bond and heating.

11 Claims, 1 Drawing Sheet

RE CROSSLINKABLE COMPOSITION AND METHOD FOR RECYCLING USING THE SAME

FIELD OF THE INVENTION

The present invention relates to a re-crosslinkable composition, and a method for re-crosslinking (recycling) a polymer crosslinked through acyl carbamate bond.

BACKGROUND OF THE INVENTION

Recently, the environment has become of major interest, and various studies about the reuse of resources have been made. Regarding non-crosslinked cured materials such as plastics, etc., a method has been known for reusing them after decomposition. However, there have never been known a method for reusing a three-dimensional crosslinked polymer, particularly cured coating film:

In Japanese Laid-Open Patent Publication No. 5-96231, there is disclosed a method for stripping a coat applied on a plastic molded article and a coat stripping agent. However, there is no description of the reuse of the stripped coat.

On the other hand, the present inventors have intensively studied (meth)acryloyl isocyanates and derivatives therefrom as well as polymers obtained from them (e.g. Japanese Laid-Open Patent Publication Nos. 60-231642, 61-272207 and 63-46207 corresponding U.S. Pat. Nos. 4,935,413, 4,788,256 and 4,816,537). They have also studied curable coating compositions based on reaction with a polyol compound, in view of the reactivity of an acyl isocyanate group or a substituted acyl isocyanate group contained in the polymer, and cured materials obtained from the compositions. Also, it has been found that the acyl carbamate bonds, which are formed by a reaction of acyl isocyanate group or substituted acyl isocyanate group with alcohol, easily proceed alcohol-substituting reaction by heating in the presence of alcohol.

OBJECTS OF THE INVENTION

The present inventors have further studied the above mentioned reaction of acyl carbamate group and have found that the alcohol-substituting reaction also proceeds on a crosslinked polymer which has been already crosslinked through acylcarbamate bond, as same as non-crosslinked compounds having acylcarbamate bonds as mentioned above. That is, a crosslinked polymer, which is prepared by crosslinking reaction of a polymer having acrylcarbamate groups with a polymer having hydroxyl groups, is mixed with alcohol and heated, to further conduct substituting reaction to return to each polymer before crosslinking.

Accordingly, the main object of the present invention is to provide a crosslinkable composition using the above polymer crosslinked through the acyl carbamate bond, and its availability for recycling.

This object as well as other objects and advantages of the present invention will become apparent to those skilled in the art from the following description with reference to the accompanying drawings.

SUMMARY OF THE INVENTION

Figure 1:
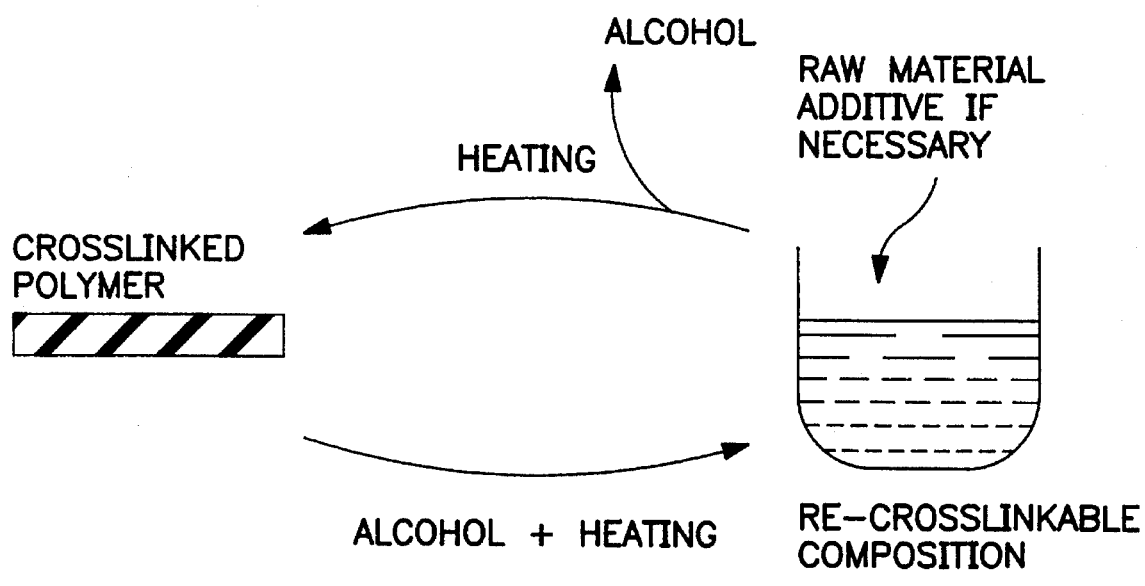
FIG. 1 is a schematic diagram illustrating a recycle process of the present invention.

The present invention provides a re-crosslinkable composition obtained by adding an alcohol to a polymer crosslinked through acyl carbamate bond and then heating the mixture.

The present invention also provides a method for recycling a polymer crosslinked through an acyl carbamate bond, which comprises adding an alcohol to the polymer crosslinked through the acyl carbamate bond and heating to give a re-crosslinkable composition, and then crosslinking the crosslinkable composition by applying the condition that the alcohol is easily vaporized out of the system to give the polymer crosslinked through the acyl carbamate bond.

DETAILED DESCRIPTION OF THE INVENTION

When a polymer crosslinked through an acylcarbamate bond is subjected to heat treatment in the presence of an alcohol, the acylcarbamate bond in the crosslinked polymer is broken or cleaved, thereby decreasing the molecular weight, although this mechanism is not uncertain. This cleavage of crosslinking point increases solubility in an alcohol. Accordingly, cleavage of the crosslinking point can be confirmed by dissolution of the crosslinked polymer in an alcohol.

Additionally, the dissolution of the crossliked polymer to an alcohol is useful for recovering of the crosslinked polymer.

The crosssslinked polymer used in the present invention is a polymer crosslinked through the acyl carbamate bond. The acyl carbamate bond means a bond moiety having a structure represented by the formula:

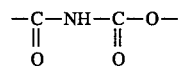

and, for example, it is a bond formed by the reaction between an acyl isocyanate group (—CO—N=C=O) or its alcohol-adduct {i.e. acyl carbamate group (—CO—NH—COO—R) where R is an alcohol residue} and polyol. The cured material is normally obtained by the curing reaction between a poly(acyl isocyanate) compound or a poly(acyl carbamate) compound and a polyol compound. The poly(acyl isocyanate) compound can be obtained by homopolymerization of (meth)acryloyl isocyanates, copolymerization of (meth)acryloyl isocyanate with an acrylic monomer containing no active hydrogen, or reaction between a compound containing two or more amide groups with oxalyl halide.

On the other hand, the poly(acyl carbamate) compound can be obtained by homopolymerization of N-(meth)acryloyl carbamates, copolymerization of N-(meth)acryloyl carbamates with an acrylic monomer containing no active hydrogen, or reaction between the above poly(acyl isocyanate) compound with a compound containing a hydroxyl group (see Japanese Laid-Open Patent Publication Nos. 60-231642 and 61-272207 corresponding to U.S. Pat. Nos. 4,953,413 and 4,788,256).

Further, the polymer mainly has the acyl carbamate bond, and may have a bond other than the acyl carbamate bond (e.g. ester bond, amide bond, urea bond, urethane bond, etc.). However, it is desired that the larger portion, preferably not less than 95%, more preferably not less than 99% of the crosslinked bonds are the acyl carbamate bond, in order to conduct the cleavage of crosslinking points or re-crosslinking efficiently.

It is preferred that the amount of the acyl carbamate group in the crosslinked polymer has already been known. Further, the crosslinked polymer can take any form such as coating film, plastic molded article, etc., and the size is not specifically limited.

In the present invention, the cleavage of crosslinking points occurs by the alcohol. As for the alcohol, a monoalcohol is preferred and the number of carbon atoms is preferably 1 to 9. Further, there can be used primary, secondary and tertiary alcohols.

Examples of the primary alcohol include methanol, ethanol, propanol, butanol, amyl alcohol, hexyl alcohol, 2-ethylhexyl alcohol, heptyl alcohol, octyl alcohol, benzyl alcohol, cyclohexanol, ethylene glycol monobutyl ether, ethylene glycol monohexyl ether, ethylene glycol-2-ethylhexyl ether, diethylene glycol monobutyl ether, diethylene glycol monohexyl ether, diethylene glycol-2-ethylhexyl ether, propylene glycol monobutyl ether, propylene glycol monohexyl ether, propylene glycol-2-ethylhexyl ether, ethylene glycol monobutyl ether, ethylene glycol monohexyl ether, ethylene glycol-2-ethylhexyl ether, dipropylene glycol monobutyl ether, dipropylene glycol monohexyl ether, dipropylene glycol-2-ethylhexyl ether and the like. Examples of the secondary alcohol include isopropyl alcohol, isobutyl alcohol and the like. Further, examples of the tertiary alcohol include t-butyl alcohol and the like. The primary or secondary alcohol is preferred in view of re-crosslinking characteristics.

It is necessary that the amount of the alcohol used for the cleavage of crosslinking points is at least 0.1-times, preferably 10-times as much as the equivalent of the acyl carbamate group in the crosslinked polymer. When the equivalent of the acyl carbamate group in the crosslinked polymer is not clear, the cleavage is preferably conducted in the state that the surface of the crosslinked polymer is immersed in the alcohol. In order to make such a state, a large amount of the alcohol is used, or an organic solvent other than the alcohol can be used in combination. The organic solvent which can be used for the cleavage is a solvent containing no active hydrogen. Examples thereof include hydrocarbons, halogenated hydrocarbons, ethers, ketones and the like. Those having a boiling point of 80° to 200° C. are preferred in view of adjustment of the solid content after cleavage and re-crosslinking.

Further, a catalyst can also be used for the cleavage of the crosslinked polymer. The use of the catalyst increases the cleavage rate, but the re-crosslinking characteristics are sometimes deteriorated. As the catalyst, there can be used those which are normally used for the transesterification. Examples thereof include inorganic acids such as hydrochloric acid, nitric acid, sulfuric acid, etc.; organic acids such as p-toluenesulfonic acid, trichloroacetic acid, trifluoroacetic acid, methylsulfonic acid, trichloromethylsulfonic acid, trifluoromethylsulfonic acid, amine salts of these acids, etc.; tin compounds such as dibutyltin oxide, dibutyltin laurate, etc.

The cleavage and re-crosslinking of the acyl carbamate bond are considered to be the equilibrium reaction represented by the following chemical scheme:

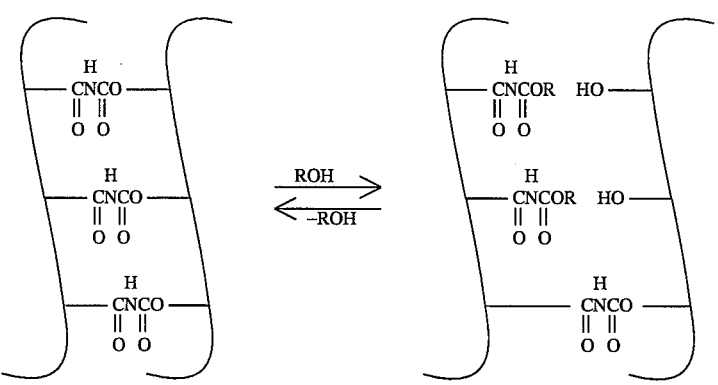

The cleavage is a reaction in favor of the right direction and the re-crosslinking is that in favor of the left direction. Since the reaction in favor of both directions is an equilibrium reaction, the cleavage or re-crosslinking can be conducted by shifting the equilibrium in favor of the right or left direction. For example, when the equilibrium is shifted in favor of the cleavage (right) direction, a large amount of the alcohol is used, or the adjustment is conducted so that the alcohol may not be vaporized. Preferably, a state may be achieved wherein the alcohol is retained: with a reflux condenser in the system so that the alcohol may not be vaporized out of the system.

On the other hand, when the equilibrium is shifted in favor of the re-crosslinking (left) direction, a state may be achieved wherein the alcohol is vaporized out of the system. The state that the alcohol is vaporized out of the system can be made by heating in the open system. For example, the alcohol is vaporized by heating the re-crosslinkable composition in a gas furnace or an electric furnace which is normally used for thermosetting, thereby causing progress of crosslinking.

The completion of the cleavage is preferably conducted by terminating the reaction at the point at which the original form of the crosslinked polymer can not be visually confirmed, optionally followed by cooling. For example, in case of coating film, it is preferable to terminate the reaction immediately after the coating film was dissolved in the alcohol. When heating to cleave crosslinking bonds is continued for a long period of time, the re-crosslinking characteristics can be deteriorate, therefore prolonged heating is not preferred.

The product obtained in the cleavage process contains a large amount of a volatile component, and the solid fraction of the product obtained by cleavage normally becomes low. Further, the solid fraction can be represented by the retention of the weight before and after heating a sample at 80° C. under 10 mmHg or less for 30 minutes.

Examples of the volatile content include a large amount of the alcohol used for the cleavage, the resulting compound after cleavage, and an organic solvent under certain circumstances. In order to re-crosslink the composition of the present invention, efficiently, it is desired to adjust to the solid fraction which corresponds to the respective application method, according to a method of removing the volatile content and adding the solvent, if necessary. Further, some product obtained in the cleavage process sometimes contain an insoluble content such as pigment, etc. If the insoluble content becomes a problem on operation when the re-crosslinking is conducted, the insoluble content is removed by a means such as filtration, etc. and it can be used in the next process.

The re-crosslinkable composition can be obtained by heating a product obtained by cleavage of crosslinking points in the form of a film (obtained by using a means such as bar coater, doctor blade, spray, spin-coater, etc.) or a predetermined form (obtained by molding into a die) at 80° to 200° C. for a predetermined time, preferably 20 to 60 minutes. The evaluation of the curing characteristics of the resulting re-crosslinked film can be conducted by a normal method such as solvent resistance test, etc.

The re-crosslinkable composition of the present invention can be obtained by adding the alcohol and heating, as described above, and a compound selected from the group consisting of a poly(acyl carbamate) compound, a polyol compound and a mixture thereof as a raw material may be further formulated in this composition so as to enhance curing performances of the composition and performances of the resulting polymer. Preferred examples of the poly(acyl carbamate) compound include those described hereinabove. As the polyol compound, there can be used those which are normally used for the composition for crosslinking. Examples thereof include polyacryl polyol, polyurethane polyol, polyether polyol, polyester polyol, polyvinyl alcohol, low-molecular weight polyhydric alcohol and the like. The composition may optionally contain other additives such as surfactants, colorants, ultraviolet absorbers, antioxidants etc., as a matter of course.

It is also possible to conduct the same treatment on a re-crosslinked polymer obtained by crosslinking a re-crosslinkable composition of the present invention again to give the re-crosslinkable composition which is further re-crosslinked. It is possible to repeat this cleavage-re-crosslinking cycle over and over again, practically. This recycle process is shown in FIG. 1.

According to the present invention, a crosslinked polymer can be reused by converting the polymer crosslinked through an acyl carbamate bond to a re-crosslinkable composition again, followed by recuring it. According to the present invention, resources can be used efficiently.

EXAMPLES

The following Preparation Examples, Examples and Comparative Examples further illustrate the present invention in detail but are not to be construed to limit the scope thereof.

Preparation Example 1 Preparation of Crosslinked Polymer Containing No Pigment A mixture of 10 g of an acrylic copolymer containing a hexyloxyethyl carbamate group as an acyl carbamate group (amount of acyl carbamate group: 2.72 mmols/g, number-average molecular weight: 3,600, volatile content: 38%, solvent: methyl isobutyl ketone (MIBK), comonomer: styrene, 2-ethylhexyl methacrylate) and 10 g of an acrylic polyol HR-554 (manufactured by Mitsubishi Rayon Co., Ltd., amount of hydroxyl group: 1.69 mmols/g, number-average molecular weight: 4,000, volatile content: 60%, solvent: Sorbesso 150/n-butanol) was applied on a polypropylene plate degreased with n-hexane, using a doctor blade #16. After setting for 30 minutes, the coated plate was stoved at 120° C. for 30 minutes to give a cured film of 80 μm in thickness. This cured film was stripped from the polypropylene plate and cut into a piece of 1 cm×1 cm in size to give a crosslinked polymer.

Preparation Example 2 Preparation of Crosslinked Polymer Containing Pigment (1)

A mixture of 10 g of the acyl carbamate group-containing an acrylic copolymer of Preparation Example 1, 10 g of acrylic polyol HR-554 and 4 g of a white pigment Thaipake R-930 was subjected to the same operation as that of Preparation Example 1 to give a crosslinked polymer.

Preparation Example 3

Preparation of Crosslinked Polymer Containing Pigment (2)

A pigment paste was obtained by dispersing 20 g of a red pigment Cinquasha magenta and 51 g of a resin for dispersing pigment, polyester polyol. A mixture of 5 g of the pigment paste, 10 g of the acyl carbamate group-containing acrylic copolymer of Preparation Example 1 and 10 g of an acrylic polyol HR-554 was subjected to the same operation as that of Preparation Example 1 to give a cured material.

Examples 1 to 10 and Comparative Examples 1 and 2

Cleavage Process

To a flask equipped with a Dimroth condenser, the crosslinked polymer obtained in Preparation Example 1 and a predetermined amount of an alcohol and, if necessary, a predetermined amount of MIBK were added, and the mixture was heated to a predetermined temperature while stirring with a magnetic stirrer. The reaction was visually observed and the reaction was terminated at the point at which the crosslinked polymer has been dissolved to give a product.

Solid Fraction Adjustment Process

The volatile content of the product (solid fraction: about 5%) obtained in the cleavage process was distilled off under reduced pressure with heating. To the resulting residue, hexyl cellosolve and MIBK were added and, then, a weight ratio of residue/hexyl cellosolve/MIBK was set to 2/1/1 to give a product having a solid fraction of 50% wherein the solid fraction has been adjusted.

Re-crosslinking Process

The resulting product wherein the solid fraction has been adjusted was applied on a tinplate degreased with xylene, using bar coater #25. After setting for 30 minutes, the coated plate was stoved at 120° C. for 30 minutes to give a re-crosslinked film.

Evaluation of Curing Characteristics of Re-crosslinked Film (1)

To the resulting re-crosslinked film, 0. 1 ml of toluene, ethyl acetate and acetone were dropped, respectively, and the state of the coating film was visually observed. The evaluation criteria are as follows.

A: No trace of spot is observed.
B: Ring trace is remained.
C: Whole circumference of spot is slightly blistered.
D: Whole spot is slightly blistered.
E: Dissolved.

The results obtained by changing the condition of cleavage of crosslinking points are shown in Table 1.

TABLE 1

| No. | Crosslinked polymer | Alcohol | Solvent | Weight ratio of crosslinked polymer/alcohol/ solvent | Equivalent ratio of hydroxyl group/acyl carbamate group |
|---|---|---|---|---|---|
| Example 1 | Preparation Example 1 | Hexyl cellosolve | MIBK | 1/4/16 | 10.1 |
| Example 2 | Preparation Example 1 | Ethanol | MIBK | 1/4/16 | 32.0 |
| Example 3 | Preparation Example 1 | Isopropyl alcohol | MIBK | 1/4/16 | 24.5 |
| Example 4 | Preparation Example 1 | t-Butanol | MIBK | 1/4/16 | 19.9 |
| Example 5 | Preparation Example 1 | Hexyl cellosolve | MIBK | 1/0.09/16 | 0.2 |
| Example 6 | Preparation Example 1 | Hexyl cellosolve | MIBK | 1/4/16 | 10.1 |
| Example 7 | Preparation Example 1 | Hexyl cellosolve | MIBK | 1/4/16 | 10.1 |
| Example 8 | Preparation Example 1 | Hexyl cellosolve | MIBK | 1/4/16 | 10.1 |
| Example 9 | Preparation Example 2 | Hexyl cellosolve | MIBK | 1/4/16 | 10.1 |
| Example 10 | Preparation Example 3 | Hexyl cellosolve | MIBK | 1/4/16 | 10.1 |
| Comparative Example 1 | Preparation Example 1 | n-Hexylamine | Dioxane | 1/4/16 | |
| Comparative Example 2 | Preparation Example 1 | Hexyl cellosolve | MIBK | 1/4/16 | 10.1 |

| No. | Catalyst*[1] | Cleavage temperature | Cleavage time | Evaluation of curing characteristics of re-crosslinked film Toulene/butyl acetate/ acetone |
|---|---|---|---|---|
| Example 1 | — | 117° C. | 80 Min. | A/A/A |
| Example 2 | — | 98° C. | 170 Min. | A/A/A |
| Example 3 | — | 95° c. | 250 Min. | A/A/A |
| Example 4 | — | 100° C. | 540 Min. | A/B/C |
| Example 5 | — | 117° C. | 300 Min. | B/D/D |
| Example 6 | p-Toluene sulfonic acid | 117° C. | 75 Min. | C/D/D |
| Example 7 | Sulfuric acid | 117° C. | 60 Min. | B/B/D |
| Example 8 | Dibutyltin | 117° C. | 60 Min. | B/B/D |
| Example 9 | — | 117° C. | 85 Min. | A/A/A |
| Example 10 | — | 117° C. | 85 Min. | A/A/A |
| Comparative Example 1 | — | 100° c. | 60 Min. | E/E/E |
| Comparative Example 2 | — | 65° C. | No change in 540 minutes | — |

*[1]: The amount of the catalyst to be added is 10 molar % for the acyl carbamate group.

EXAMPLE 11

To a flask equipped with a Dimroth condenser, 1 g of the crosslinked polymer obtained in Preparation Example 1, 4 g of hexyl cellosolve and 16 g of MIBK were added, and the mixture was heated to a predetermined temperature while stirring with a magnetic stirrer. The reaction was visually observed and the reaction had been conducted for 20, 40, 60, 120 and 180 minutes, respectively, since the point at which the crosslinked polymer was dissolved to give a re-crosslinkable composition. According to the same manner as that described in Examples 1 to 10, this re-crosslinkable composition was subjected to the solid fraction adjustment and re-crosslinking processes to give a re-crosslinked film.

Evaluation of Curing Characteristics of Re-crosslinked Film (2)

The resulting re-crosslinked film was extracted under acetone reflux condition for 3 hours and a change in weight was measured, thereby measuring a gel fraction [(weight before extraction)/(weight after extraction)×100]. The results are shown in Table 2.

TABLE 2

| Time (minutes) | 0 | 20 | 40 | 60 | 120 | 180 |
|---|---|---|---|---|---|---|
| Gel fracton (%) | 90.2 | 88.9 | 87.3 | 88.4 | 86.2 | 83.4 |

EXAMPLE 12

To a flask equipped with a Dimroth condenser, 1 g of the crosslinked polymer obtained in Preparation Example 1, 4 g of hexyl cellosolve and 16 g of MIBK were added, and the mixture was heated to a predetermined temperature while stirring with a magnetic stirrer. The reaction was visually observed and the reaction was terminated at the point at which the crosslinked polymer was dissolved to give a re-crosslikable composition. According to the same manner as that described in Examples 1 to 10, this re-crosslinkable composition was subjected to the solid fraction adjustment process. The resulting composition wherein the solid fraction had been adjusted was applied on a polypropylene plate degreased with n-hexane, using a doctor blade #16. Separately, the re-crosslinkable composition was applied on a tinplate degreased with xylene, using a bar coater #25. After setting for 30 minutes, the coated plate was stoved at 120° C. for 30 minutes to give a re-crosslinked film, respectively.

According to the same manner as that described in Preparation Example 1, the re-crosslinked film obtained on the polypropylene plate as the stripped and cut crosslinked polymer was subjected to the cleavage, solid fraction adjustment and re-crosslinking processes again. On the other hand, according to the same manner as that described in the evaluation of curing characteristics of the re-crosslinked film (2) of Example 11, the gel fraction of the re-crosslinked film obtained on the tinplate was measured. A change in gel fraction obtained by repeating the crosslinking -cleavage of crosslinking points-re-crosslinking cycle is shown in Table 3.

TABLE 3

| Number of recycle | 0 | 1 | 2 | 3 |
|---|---|---|---|---|
| Gel fraction (%) | 90.2 | 86.7 | 84.3 | 75.4 |

What is claimed is:

1. A re-crosslinkable composition obtained by adding a monoalcohol having 1 to 9 carbon atoms to a polymer crosslinked through acyl carbamate bond and heating.

2. The re-crosslinkable composition according to claim 1, wherein the heating is conducted under the condition that the alcohol is not vaporized out of the system.

3. The re-crosslinkable composition according to claim 1, which further contains a compound selected from the group consisting of a poly(acyl carbamate) compound, a polyol compound and a mixture thereof.

4. The re-crosslinkable composition. according to claim 1, wherein the heating is conducted at 80° to 200° C.

5. A method for increasing solubility of a polymer crosslinked through acyl carbamate bond to an alcohol, which comprises adding a monoalcohol having 1 to 9 carbon atoms to the polymer crosslinked through the acyl carbamate bond and heating.

6. The method according to claim 5, wherein the heating is conducted under the condition that the alcohol is not vaporized out of the system.

7. A method for re-crosslinking the re-crosslinkable composition of claim 1, which comprises subjecting the re-crosslinkable composition to the condition that an alcohol is easily vaporized out of the system.

8. A method for recycling a polymer crosslinked through acyl carbamate bond, which comprises adding a monoalcohol having 1 to 9 carbon atoms to the polymer crosslinked through the acyl carbamate bond and heating to give a recrosslinkable composition , and then re-crosslinking the re-crosslinkable composition by putting it under the condition that the alcohol is not vaporized out of the system.

9. The method according to claim 8, wherein heating resulting in recrosslinking is conducted under the condition that the alcohol is easily vaporized out of the system.

10. The method according to claim 8, wherein the re-crosslinkable composition further contains a compound selected from the group consisting of a poly(acyl carbamate) compound, a polyol compound and a mixture thereof.

11. A method for recycling a polymer crosslinked through acyl carbamate bond, which comprises heating said crosslinked polymer in the presence of a monoalcohol to a temperature sufficiently high to cleave crosslinking bonds in said polymer.

* * * * *